INVENTORS
Warren L. Nelson
Christopher E. Norton
BY *Max L. Libman*
ATTORNEY

INVENTORS
Warren L. Nelson
Christopher E. Norton
BY
ATTORNEY

United States Patent Office 3,398,545
Patented Aug. 27, 1968

3,398,545
HYDROGEN RECOVERY FROM A REFINERY TAIL
GAS EMPLOYING TWO STAGE SCRUBBING
Warren L. Nelson, Montreal, Quebec, Canada, and Christopher E. Norton, London, England, assignors to Conch International Methane Limited, Nassau, Bahamas, a Bahamian company
Filed Feb. 4, 1966, Ser. No. 525,081
Claims priority, application Canada, Mar. 19, 1965, 926,040
7 Claims. (Cl. 62—17)

ABSTRACT OF THE DISCLOSURE

A process for separating hydrogen and hydrocarbons from a refinery tail gas, using the refrigeration potential of available liquid natural gas which is to be gasified as a separate product during the process, and which is also used as a scrubbing agent to remove nitrogen and oxides of carbon from the partially purified hydrogen during the process. Methane is removed from the tail gas by indirect heat exchange with nitrogen which has been cooled by heat exchange with liquid natural gas. A second scrubbing step is employed to substantially remove remaining methane from the hydrogen.

---

This invention relates to the separation of a refinery tail gas into its constituent components, and more particularly, it relates to the separation of a refinery tail gas utilizing the refrigeration potential in liquefied natural gas (LNG).

It has become common practice to transport natural gas by liquefying it, since in liquid form the natural gas requires much less room for storage. When the natural gas is delivered to its dsetination, it usually must be vaporized and compressed to pipeline pressure for use, and during vaporization the refrigeration potential in the LNG is commonly wasted. Accordingly, it is an object of the present invention to provide a system for separating a refinery tail gas feed into its constituent components utilizing much of the refrigeration potential in the LNG. Accordingly, in one of its aspects the invention comprises a process for separating hydrogen and hydrocarbons from a refinery tail gas of the type comprising hydrogen, methane, hydrocarbons heavier than methane, nitrogen, and oxides of carbon, said process comprising (a) Introducing said refinery tail gas as a feed stream,
(b) Removing from said feed stream hydrocarbons heavier than methane to leave said feed stream as a gaseous effluent comprising methane, hydrogen, nitrogen, and oxides of carbon,
(c) Condensing the bulk of the methane from said gaseous effluent by indirect heat exchange with a stream of evaporating liquid nitrogen and a stream of regasified liquid natural gas, to leave said feed stream as primarily a hydrogen gas stream, contaminated with nitrogen and oxides of carbon,
(d) Scrubbing the hydrogen gas stream with liquid natural gas to remove said contaminating nitrogen and oxides of carbon, and
(e) Scrubbing the hydrogen gas stream resulting from said step (d) with a subcooled $C_2$ or $C_3$ hydrocarbon to remove residual methane therefrom.

In addition, refinery tail gases usually contain hydrogen which is to be recovered, and in recovery and purification of the hydrogen, scrubbing liquids are commonly used to remove impurities such as nitrogen, carbon monoxide, and methane from the hydrogen. These scrubbing liquids (commonly methane to remove the nitrogen and carbon monoxide impurities and propane to remove the methane impurities) have, in the past, after their use for scrubbing, been cleaned and regenerated and reused for scrubbing. The cleaning and regeneration process required a considerable amount of equipment and power. Accordingly, it is an object of the present invention in another of its aspects to provide a system in which the scrubbing liquids are constituted by LNG and by suitable products from the refinery tail gas and, after their initial use for scrubbing, are removed from any further scrubbing use. Preferably the refrigeration potential in the contaminated scrubbing liquids is then recovered, thereby vaporizing such liquids, and the resulting vapors are compressed to pipeline pressure and joined with vaporized pure natural gas for consumer use.

It is assumed that the LNG used in the system to be described is pure methane, or virtually pure methane, as will generally be the case.

Other objects and advantages of the present invention will appear in the following description, in which the specific arrangement illustrated is provided by way of example only, the scope of the invention being defined by the appended claims.

In the drawings:

FIG. 1 shows, partially in block diagram form, an overall flow sheet for a refinery tail gas separation system according to the present invention;

FIGS. 2 and 3 together show a separation unit for the system of FIG. 1;

FIG. 5 is a highly schematic simplified block diagram showing the major steps of the process.

The description which follows will describe a refinery tail gas separation system, for separating a refingery tail gas into its various components. A typical refinery tail gas may comprise 20% hydrogen, 5% carbon monoxide and nitrogen, 40% methane, 5% ethylene, 15% ethane, 5% propylene, 9.5% propane, 0.5% butane and constituents heavier than butane. It will be understood that the temperatures, pressures and compositions referred to throughout this description are not intended to be precise, but are illustrative only, for facilitating understanding of the present invention.

As will be described in detail shortly, the feed stream as it progresses through the system undergoes successive coolings which condense fractions of the feed stream into liquids, until finally, the only part of the feed stream remaining in vapor form is the hydrogen portion (with some impurities).

For ease in following the drawings, a coding has been adopted, as shown in the legend.

More particularly, conduits carrying LNG, natural gas vapor, or any stream consisting predominantly of methane, whether in gaseous or liquid form, are shown as lines with a series of cross dashes superimposed thereon.

Conduits carrying the vapor portion of the feed stream, or mixed vapor-liquid portions of the feed stream (but not liquids separated from the feed stream) are shown as lines with superimposed dots until the stage where the feed stram, consisting of 99.8% hydrogen gas and 0.2% nitrogen gas, reaches a nitrogen adsorber which removes the nitrogen impurity. The conduits carrying the resulting pure hydrogen gas are then shown as plain lines, as are conduits carrying other materials.

Figure 1:
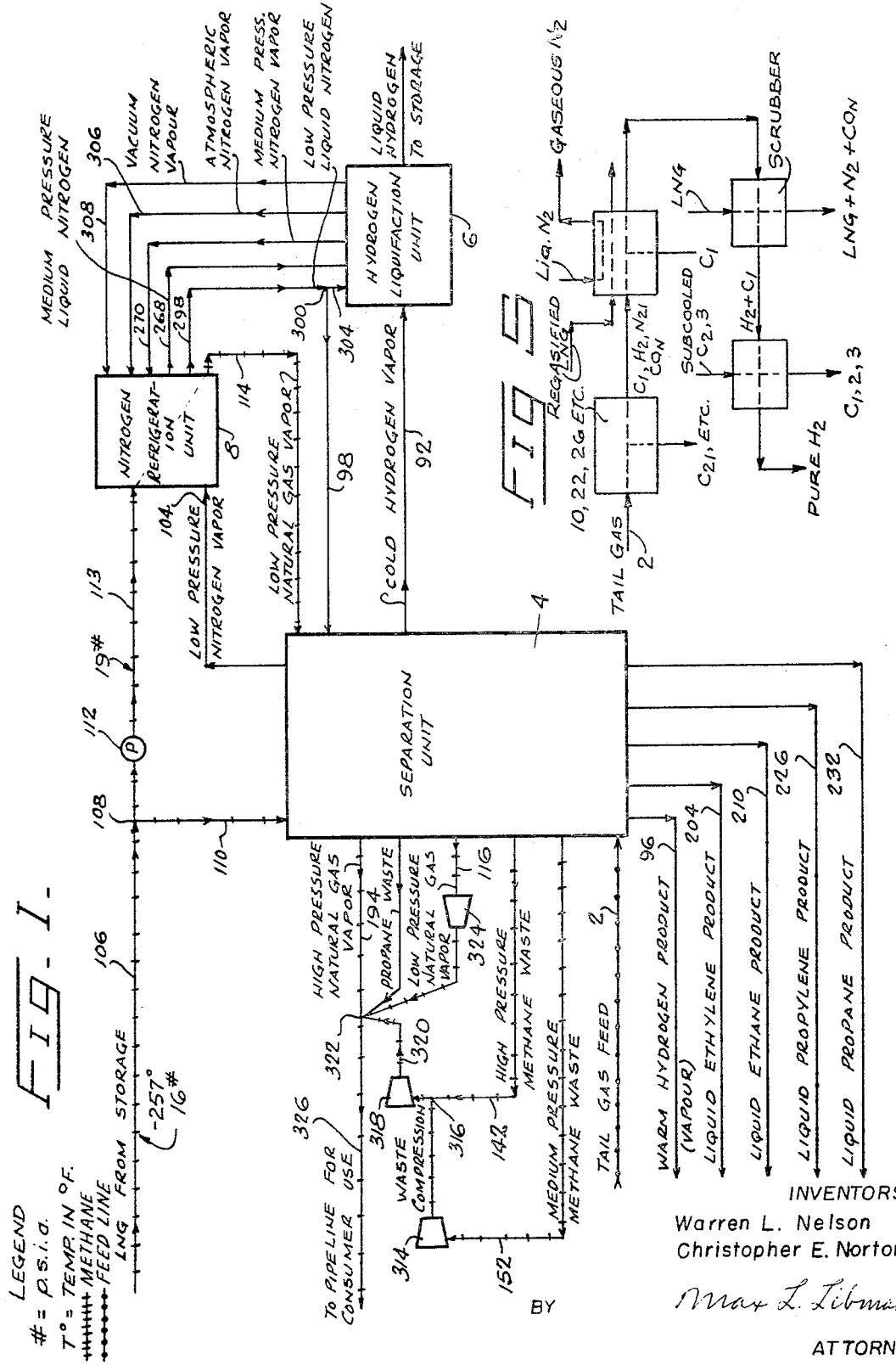

Reference is first made to FIG. 1, which shows partially in block diagram form an overall flow sheet for a refinery tail gas separation system according to the present invention. A refinery tail gas is introduced into the system, via a conduit 2, typically at a pressure of 150 p.s.i.a. (pounds per square inch, absolute) and a temperature of 86° F. The tail gas feed in conduit 2 enters a separation unit indicated generally at 4. Connected to separation unit 4 are a hydrogen liquefaction unit 6 and a nitrogen refrigeration unit 8, to both of which further reference will be made presently.

Figure 2:
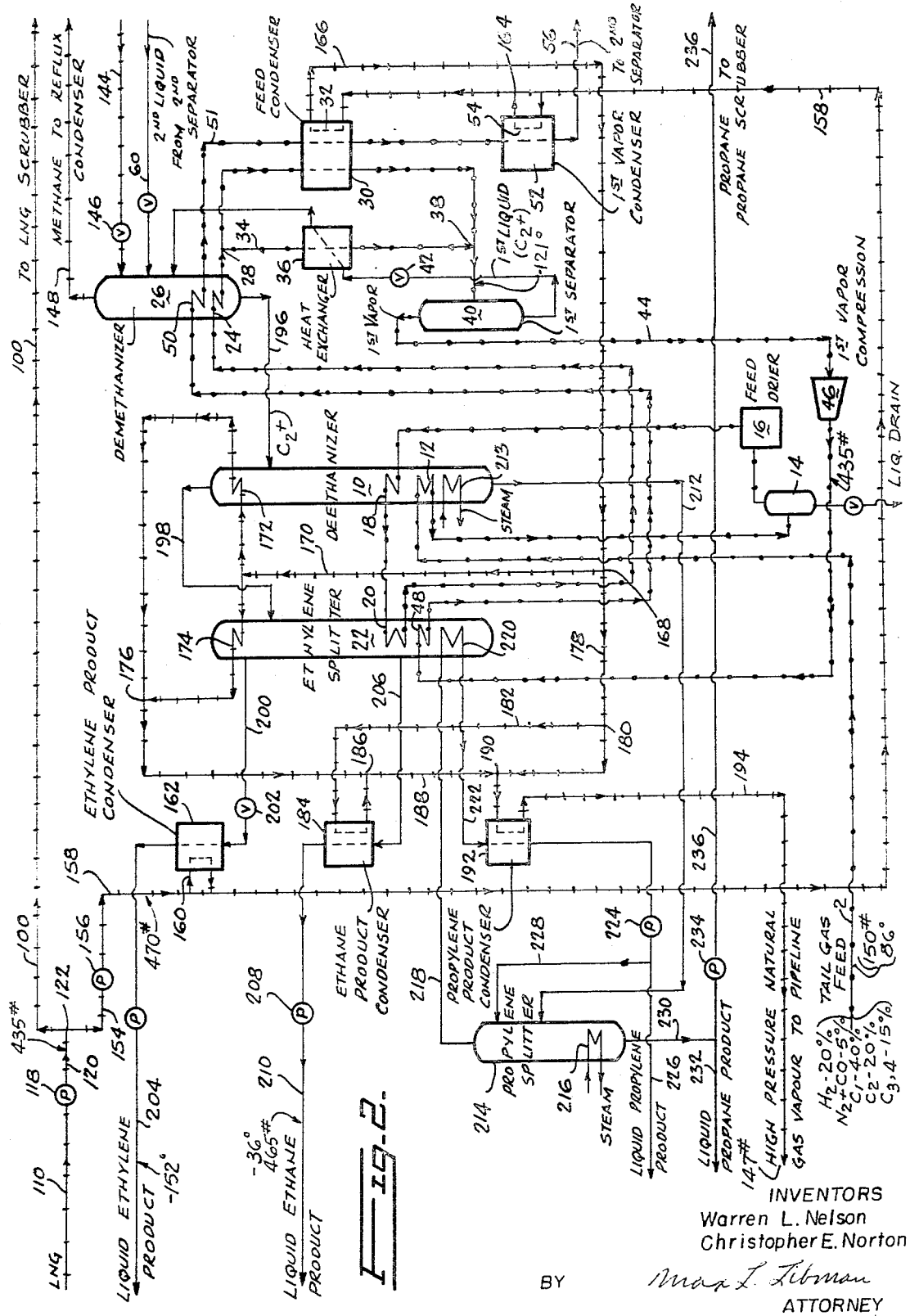
Figure 3:
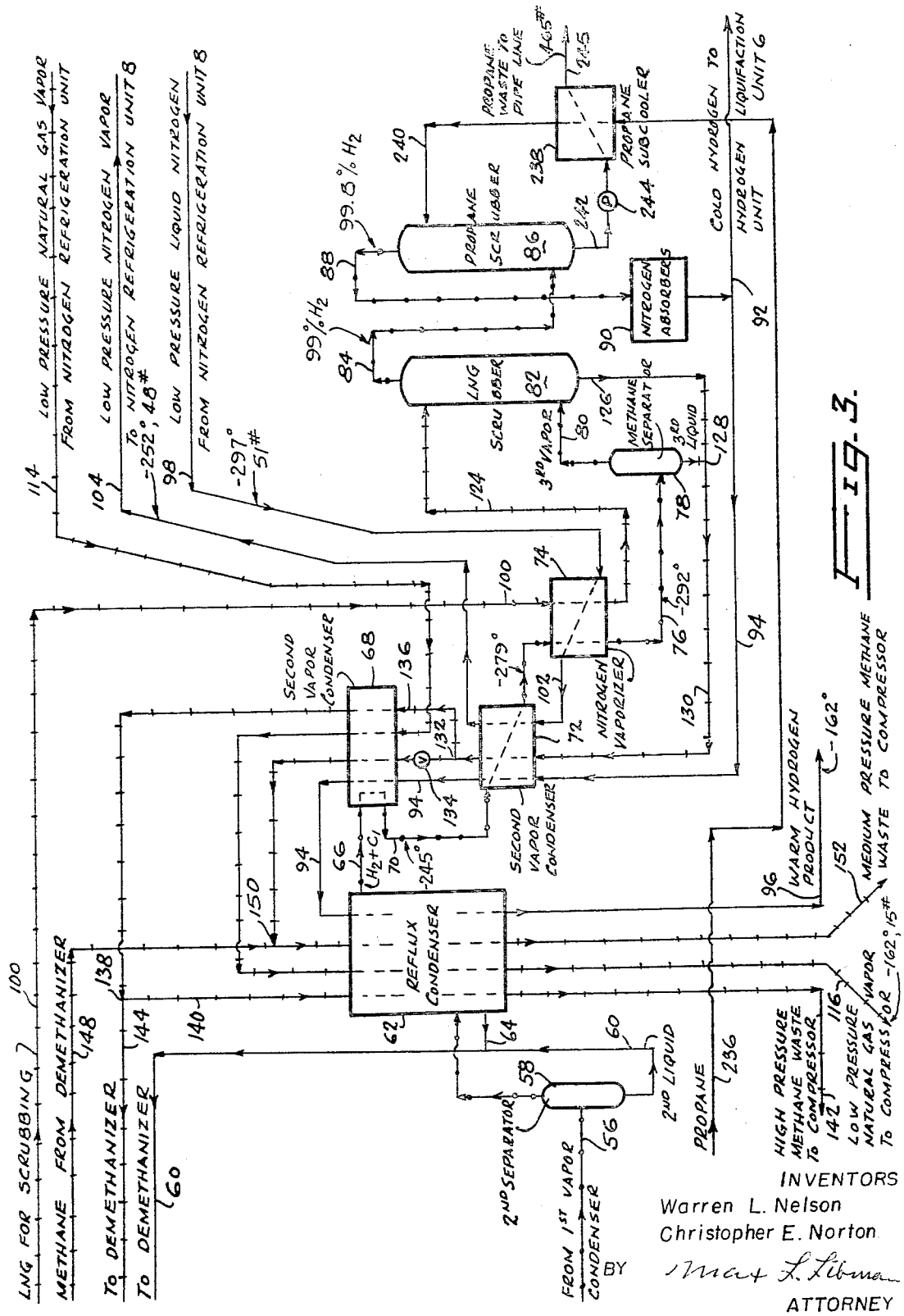

Reference is next made to FIGS. 2 and 3, which together show in detail the separation unit shown at 4 in FIG. 1. FIGS. 2 and 3 each represent portions of the separation unit, as will become apparent if the two drawings are fitted together end-to-end so that the various conduits match.

The tail gas feed entering separation unit 4 via conduit 2 is first conducted to a deethanizer 10 (FIG. 2) where it enters a reboil coil 12 to provide reboil for the deethanizer and is cooled in the process, typically to about 50° F. The cooled feed gas leaving coil 12 is conducted to a separator 14 where any condensed liquids are drained off, and it is then conducted to a feed drier 16 for drying. It may be noted that because the feed gas is cooled before drying, the feed drier 16 can be of smaller size than would be necessary were the feed gas brought into the drier at its original temperature of $+86°$ F.

The dried feed stream is next conducted to another reboil coil 18 of the deethanizer 10, then to a reboil coil 20 of an ethylene splitter 22, and then to a reboil coil 24 of a demethanizer 26, cooling and some condensation of the feed stream occurring along this path. After leaving coil 24 the feed stream, now at a temperature of about $-30°$ F., splits at point 28 into two parts, the bulk of the feed stream passing through a feed condenser 30 where it is cooled by indirect heat exchange with LNG in a coil 32. A small part of the feed stream is conducted via conduit 34 through a heat exchanger 36 where some cooling occurs and this small part then joins the main feed stream at point 38, the temperature of the combined feed stream at this point being approximately $-121°$ F.

By this point the feed stream has been cooled sufficiently so that a considerable portion of it has condensed (about a third) and the feed stream now enters a first separator 40 where the liquid and gaseous portions are separated, the liquid portion now being termed a first liquid and the gaseous portion being termed a first vapor. The separation at this point is a rough one between ethylene and the heavier components of the feed stream in the first liquid on the first hand, and the lighter components of the feed stream (i.e. methane, hydrogen, nitrogen and carbon monoxide) in the first vapor, on the other hand. Since this first separation is only a rough one, the first vapor still contains substantial portions of ethylene and heavier components while the first liquid contains some methane, nitrogen, hydrogen, and carbon monoxide.

The first liquid leaving the bottom of separator 40 is expanded through a valve 42, passes through heat exchanger 36 to cool the portion of the feed stream passing therethrough, and then enters demethanizer 26 for further separation, as well be described later.

The first vapor, leaving the top of separator 40, passes through conduit 44 to a compressor 46 where it is compressed to high pressure (approximately 435 p.s.i.a.) and is heated in the process of compression to close to ambient temperature. It may be noted that considerably less power is required to compress the first vapor than would be required if the entire tail gas feed (i.e. before cooling and separation into a first liquid and a first vapor) were being compressed, as has commonly been the practice in the past.

From compressor 46 the first vapor is conducted to a reboil coil 48 of ethylene splitter 22. After being cooled slightly in reboil coil 48, the first vapor is conducted to a reboil coil 50 of the demethanizer 26, where it is cooled further (to a temperature of about $-30°$ F.) and then conducted via a conduit 51 to feed condenser 30 where it is cooled by indirect heat exchange with LNG in coil 32 to a temperature of approximately $-121°$ F. The first vapor next passes through a first vapor condenser 52 where it is further cooled by indirect heat exchange with LNG in coil 54 to a temperature of about $-139°$ F. As the first vapor passes through the successive coolings mentioned, about one quarter of its volume condenses, and accordingly, after leaving the first vapor condenser 52, the first vapor passes via conduit 56 into a second separator 58 (FIG. 3) where the liquid (termed a second liquid) and the vapor (termed a second vapor) are separated.

The second liquid contains most of the ethylene and heavier components contained in the first vapor (but containing some methane and lighter components), passes through conduit 60 and is expanded into the demethanizer 26 for further separation. The second vapor, consisting mainly of lighter components such as methane and hydrogen, but still with some heavier components such as ethylene and ethane, is directed to a reflux condenser 62 where it is cooled by indirect heat exchange with various streams (to be described presently) passing through the reflux condenser. In the reflux condenser, nearly all components of the second vapor including and heavier than ethylene are liquefied, and these liquefied components are conducted via conduit 64 to conduit 60, through which these components then pass to be expanded into the demethanizer 26.

The second vapor leaving the top of the reflux condenser 62 via conduit 66 is at a temperature of approximately $-184°$ F. and consists mainly of hydrogen and methane. In fact, the second vapor still contains about 58% of the methane originally present in the refinery tail gas feed (the remainder having been condensed in the first and second liquids and in the reflux condenser and then directed to the demethanizer for separation). The second vapor leaving the top of reflux condenser 62 also contains about 80% of the nitrogen and carbon monoxide originally present in the feed stream.

Further cooling of the second vapor now occurs, in order to separate the methane from the hydrogen, prior to purification of the hydrogen. After leaving the reflux condenser via conduit 66, the second vapor enters a second vapor condenser 68 where it is cooled to about $-245°$ F. by indirect heat exchange with two methane "waste" streams, a hydrogen stream, and a low pressure natural gas vapor stream, as will be explained in more detail shortly. The second vapor leaves condenser 68 via conduit 70 and enters another second vapor condenser 72 where it is cooled to a temperature of $-279°$ F. by indirect heat exchange with a hydrogen stream, a methane waste stream, and a gaseous nitrogen stream, again as will be explained in more detail later. The second vapor leaving condenser 72 via conduit 73 next enters a nitrogen vaporizer 74 where it is cooled by indirect heat exchange with evaporating low pressure liquid nitrogen to a temperature of $-292°$ F.

As the second vapor passes through condensers 68 and 72 and nitrogen vaporizer 74, condensation of its methane progressively occurs. Since by the time the second vapor has passed through the nitrogen vaporizer 74, most of its methane has been liquefied, the second vapor is next conducted via conduit 76 into a methane separator 78 where the liquefied methane (which may be termed a third liquid) is removed. Vapor leaves the top of the methane separator via a conduit 80, this vapor now being termed the third vapor and comprising approximately 96.6% hydrogen with impurities consisting of nitrogen, methane and carbon monoxide. The third vapor enters LNG scrubber 82 where it is scrubbed with a stream of medium pressure subcooled LNG to remove most of the nitrogen, the third vapor leaving the LNG scrubber via conduit 84, still at a temperature of $-292°$ F. and now consisting approximately of 99% hydrogen, traces of nitrogen and some methane. The third vapor passes through conduit 84 to a propane scrubber 86 where it is scrubber by a stream of subcooled liquid propane to remove the methane impurity. The third vapor (which may also be referred to as an almost pure hydrogen gas stream) leaves the top of the propane scrubber 86, via conduit 88, now consisting of approximately 99.8% hydrogen and 0.2% nitrogen, and next passes through nitrogen adsorber 90 where the last traces of impurities are removed. Most of the resulting cold hydrogen product, at a temperature of approximately −287.5° F., and in gaseous form, then leaves the separation unit via conduit 92 and enters the hydrogen liquefaction unit 6 shown in FIG. 1. However, some of the cold hydrogen product (about one-fifth) is directed via conduit 94 through second vapor condensers 72 and 68 respectively to assist in condensing the methane fraction of the second vapor, through reflux condenser 62 to assist in the separation of the ethylene and ethane from the second vapor, and then leaves the separation unit (at a temperature of about −162° F.) through conduit 96, for customer use.

Reference is next made to the use of nitrogen in the separation unit. Low pressure liquid nitrogen from the nitrogen refrigeration unit 8 enters the separation unit 4, via conduit 98 (FIG. 3) at a temperature of approximately −297° F. and a pressure of approximately 51 p.s.i.a. The liquid nitrogen passes through nitrogen vaporizer 74 where it is vaporized, thereby cooling by indirect heat exchange the second vapor as mentioned and also cooling a relatively high pressure LNG stream (later used for scrubbing the third vapor or impure hydrogen stream) entering the nitrogen vaporizer via a conduit 100. The nitrogen stream leaves nitrogen vaporizer 74 via conduit 102, still at a temperature of approximately −297° F., and passes through the second vapor condenser 72 where it assists in condensing by indirect heat exchange the second vapor entering the second vapor condenser via conduit 7. The nitrogen vapor leaving the second vapor condenser has now been warmed to a temperature of approximately −252° F. and is at the relatively low pressure of about 48 p.s.i.a., and this low pressure nitrogen vapor is conducted back to the nitrogen refrigeration unit via conduit 104.

The LNG and natural gas vapor cycles in the separation unit will next be explained in more detail. Preliminary reference is first made to FIG. 1 where LNG is shown entering the overall system from storage, via conduit 106, at a temperature of about −257° F. and a pressure of about 16 p.s.i.a. The LNG stream in conduit 106 branches at point 108, most of the stream passing into separation unit 4 via conduit 110, but some being pumped by low pressure pump 112 to a pressure of about 19 p.s.i.a. and then flowing via conduit 113 to the nitrogen refrigeration unit 8. After use in unit 8 (which use will be explained in more detail later) the low pressure natural gas, now in vapor form and at a temperature of about −252° F., leaves unit 8 via conduit 114 and enters separation unit 4. As may be seen from FIG. 3, this natural gas vapor is conducted to second vapor condenser 68 to assist in condensing the methane from the second vapor, then through reflux condenser 62, and finally leaves separation unit 4, via conduit 116, at a temperature of about −162° F. and a pressure of about 15 p.s.i.a. This low pressure natural gas vapor is then compressed to pipeline pressure, as will later be described.

As mentioned, the bulk of the LNG enters the separation unit 4 via conduit 110 at a pressure of 16 p.s.i.a. and a temperature of about −257° F. This liquid is pumped by a pump 118 (FIG. 2) to the relatively high pressure of about 435 p.s.i.a., the LNG stream leaving pump 118 via conduit 120 and dividing at point 122 into two streams. One of these streams, representing a small part of the LNG in conduit 120, and intended for use in scrubbing the impure hydrogen vapor, passes via conduit 100 to the nitrogen vaporizer 74 (FIG. 3) where it is subcooled to a temperature of about −292° F. This cooling is performed in order to remove the nitrogen and carbon monoxide impurities from the hydrogen stream as efficiently as possible.

The subcooled LNG leaves nitrogen vaporizer 74 via conduit 124 and enters LNG scrubber 82 where, as mentioned, it scrubs most of the nitrogen and carbon monoxide impurities from the third vapor hydrogen stream. LNG leaves the bottom of scrubber 82 via conduit 126, now contaminated with carbon monoxide and nitrogen, at a temperature of about −282° F., and joins at point 128 the third liquid (mostly methane) leaving the bottom of methane separator 78. The stream leaving point 128 is at a temperature of about −288° F. and will be referred to as methane "waste" stream, because it consists mostly of methane but also contains impurities such as hydrogen, nitrogen, and carbon monoxide. The methane waste stream in line 152 is, of course, quite satisfactory for use as natural gas and after its refrigeration potential has been used, it will be compressed to pipeline pressure for use as natural gas.

The methane waste stream leaving point 128 passes via conduit 130 to second vapor condenser 72 where it assists in condensing methane from the second vapor and is itself warmed and partly vaporized in the process. Leaving condenser 72 at a temperature of about −252° F., the methane waste stream splits at point 132 into two streams, about 40% of the flow being expanded through valve 134 to a medium pressure (about 115 p.s.i.a.) and then passing through condenser 68 to assist in cooling the second vapor and being vaporized thereby. The remainder of the methane waste, still at high pressure, passes via conduit 136 through condenser 68 to assist in cooling the second vapor and then splits at point 138, most of the stream passing via conduit 140 through the reflux condenser 62 to assist in separation of the second vapor and then leaving the separation unit via conduit 142 as high pressure methane waste (at a pressure of about 404 p.s.i.a. and a temperature of −162° F.). The remaining part of the high pressure stream leaving point 138, passing through conduit 144 is expanded through valve 146 (FIG. 2) into the demethanizer 26 to provide reflux therefore. From the top of the demethanizer, a medium pressure gaseous stream at a temperature of about −205° F., and consisting mainly of methane (with hydrogen, carbon monoxide and nitrogen impurities) leaves via conduit 148, joins the medium pressure methane waste stream at point 150, and the combined streams pass through the reflux condenser for cooling the second vapor and then leave the separation unit via conduit 152 at a pressure of about 110 p.s.i.a. and a temperature of about −162° F.

Returning to FIG. 2, consider again the LNG entering the separation unit 4 via conduit 110, and after being pumped to medium pressure dividing at point 122. Most of the LNG entering point 122 leaves via conduit 154, is pumped to high pressure (470 p.s.i.a.) by pump 156, and then passes via conduit 158 to the first vapor condenser 52 and the feed condenser 30. A little of this LNG stream is diverted en route through conduit 160 to condense ethylene in an ethylene product condenser 162, to which further reference will be made presently.

At the first vapor condenser 52, part of the LNG stream, at a temperature of about −251° F., is removed and passes through coil 54 to assist in condensing the first vapor by indirect heat exchange. The LNG stream leaves coil 54 at a temperature of about −175° F., still in liquid form, and rejoins the main LNG stream at point 164. From point 164 the recombined LNG streams travel to coil 32 of feed condenser 30 where they cool both the first vapor in conduit 51 and also the main feed stream just prior to its separation into a first liquid and a first vapor. The LNG leaves feed condenser 30 via conduit 166, now at a temperature of about −143° F., and still in liquid form.

The LNG stream in conduit 166 next divides at point 168, about two-thirds of the stream passing through conduit 170 into reflux coils 172 and 174 of the deethanizer 10 and the ethylene splitter 22 respectively. In these coils the LNG vaporizes to provide reflux for the deethanizer and the ethylene splitter, and the resulting LNG vapor streams rejoin at point 176, now at a temperature of about —136° C.

The remaining portion of the LNG liquid stream at point 168 passes through conduit 178 to another branch point 180 where about half of this stream separates and passes through conduit 182 to an ethane product condenser 184 where it is vaporized to condense ethane, as will be explained shortly. Natural gas vapor leaves ethane product condenser 184 and rejoins at point 186 the natural gas vapor streams flowing from point 176. The combined natural gas vapor streams from point 186 flow through conduit 188 to point 190 where they join the liquid natural gas stream flowing upwardly (as shown in the drawings) from point 180. A combined liquid and vapor stream of natural gas flows from point 190 through a propylene product condenser 192 where the liquid portion of the natural gas stream is vaporized and the natural gas vapor is heated against condensing propylene product, as will be explained shortly. The warmed natural gas vapor stream leaves propylene product condenser 192 via conduit 194, at a temperature of about +41° F. and a pressure of about 465 p.s.i.a., and then leaves the separation unit 4.

Reference is next made to the various product streams derived from the separation unit. From the bottom of the demethanizer 26, ethylene, ethane, propylene, propane and heavier constituents are taken off via conduit 196 at a temperature of about —40° F. and enter the deethanizer 10 as feed. Ethylene and ethane leave the top of the deethanizer via conduit 198 at a temperature of about —46° F. and pass into the ethylene splitter 22 where separation occurs. Ethylene vapor leaves the top of ethylene splitter 22 via conduit 200 in vapor form, being at a pressure of about 112 p.s.i.a. and a temperature of about —74° F. This ethylene vapor is expanded through valve 202 to a pressure of about 16 p.s.i.a., thereby being cooled to its dew point of about —152° F. The gaseous ethylene stream then passes through ethylene product condenser 162 where it is condensed against the high pressure LNG stream entering the ethylene product condenser from pump 156. The liquid ethylene product then leaves the separation unit, at a temperature of about —152° F., via conduit 204.

Returning again to the ethylene splitter 22, ethane gas leaves near the bottom of the ethylene splitter via conduit 206, the ethane gas being at a pressure of about 115 p.s.i.a. and a temperature of about —38° F. The ethane gas in conduit 206 is condensed in ethane product condenser 184 against vaporizing LNG entering the ethane product condenser, and the liquid ethane, at a temperature of —38° F., is next conducted to an ethane pump 208 by which it is pumped to a pressure of about 465 p.s.i.a. for consumer use. This high pressure liquid ethane product, now at a temperature of about —36° F., then leaves the separation unit via conduit 210.

Returning to the deethanizer 10, propane and propylene leave the bottom of the deethanizer via a conduit 212 at a temperature of about +59° F. (further reboil for the deethanizer is provided by steam in reboil coil 213). The propane and propylene in conduit 212 are injected into a propylene splitter where separation between the propylene and propane occurs, reboil for the propylene splitter being provided by steam in reboil coil 216. Propylene gas leaves the top of propylene splitter 214 via conduit 218 at a pressure of about 106 p.s.i.a and a temperature of about +50° F. The propylene gas in conduit 218 is conducted to a reboil coil 220 of ethylene splitter 22 where some of the propylene is condensed in providing reboil for the ethylene splitter. The mixed liquid vapor stream of propylene still at about +50° F., leaves reboil coil 220 via conduit 222 and enters the propylene product condenser 192 where all of the remaining propylene vapor is condensed against vaporizing LNG entering condenser 192. Propylene liquid at a temperature of about +50° F. travels from the propylene product condenser to pump 224 where it is pumped to a pressure of about 147 p.s.i.a. From pump 224 some of the liquid propylene product leaves the separation unit as a product via conduit 226 while the remainder is conducted through conduit 228 into the top of the propylene splitter 214 to provide reflux.

Liquid propane leaves the bottom of the propylene splitter 214 via conduit 230 at a pressure of about 110 p.s.i.a. and a temperature of about 63° F. Most of this propane product is removed from the separation unit via conduit 232 as product, but some is used in propane scrubber 86 for scrubbing methane from the hydrogen stream, as has been mentioned. To this end, a part of the propane product from the bottom of propylene splitter 214 is conducted to pump 234 where it is compressed to high pressure (435 p.s.i.a.) and is warmed in the process to about +70° F. The high pressure liquid propane next passes through conduit 236 to propane subcooler 238 where it is cooled to approximately the temperature of the hydrogen stream (—292° F.) by propane waste from the propane scrubber. The highly cooled liquid propane leaves the propane subcooler via conduit 240 and enters the propane scrubber 86 where it scrubs most of the methane from the hydrogen stream passing through the propane scrubber. Propane liquid, now contaminated with methane, leaves the bottom of propane scrubber 86 via conduit 242, is compressed to a pressure of 465 p.s.i.a. by propane waste pump 244, passes through the propane subcooler 238 to cool the pure scrubbing propane passing therethrough, and leaves the separation unit at a temperature of about +56° F. via conduit 245.

Figure 4:
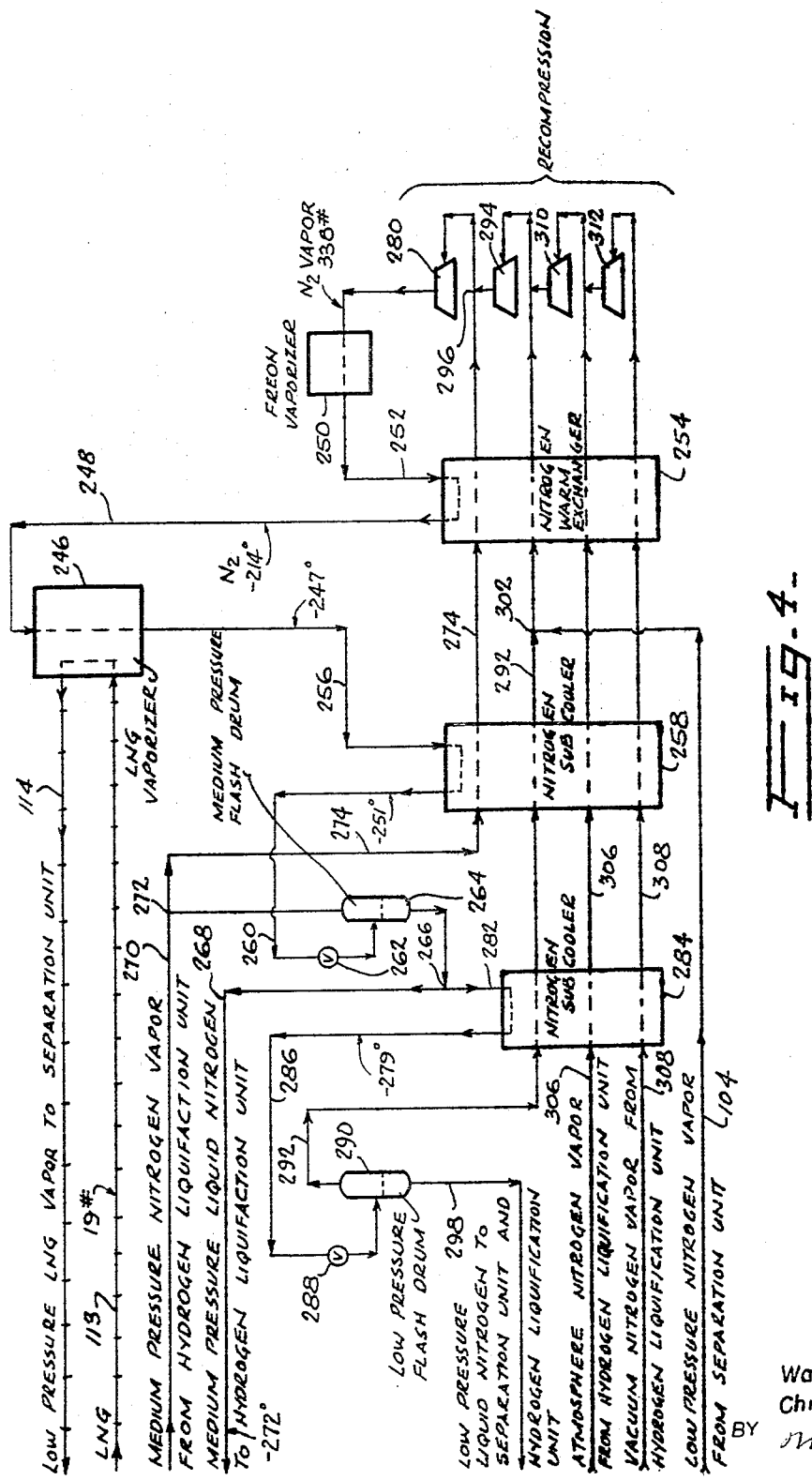
FIG. 4 shows a nitrogen refrigeration unit for the system of FIG. 1.

Reference is next made to the nitrogen refrigeration unit 8, shown in detail in FIG. 4. Low pressure LNG entering unit 8 via conduit 113 passes through an LNG vaporizer 246 where it vaporizes to condense nitrogen vapor entering vaporizer 246 via a conduit 248. The LNG leaves vaporizer 246 as low pressure natural gas vapor at a pressure of 19 p.s.i.a. and at a temperature of —225° F., and is conducted via conduit 114 from the nitrogen refrigeration unit to the separation unit 4, where, as previously described, it is warmed further in the second vapor condenser 68 and the reflux condenser 62.

Considering now the nitrogen cycle in the nitrogen refrigeration unit, high pressure nitrogen vapor, at a pressure of about 338 p.s.i.a. and a temperature of +95° F., enters a freon vaporizer 250 where it is cooled to approximately +41° F., and then passes through conduit 252 to nitrogen warm exchanger 254 where it is cooled (but not yet liquefied) against returning nitrogen vapor streams of various pressures to be described presently. The high pressure nitrogen vapor leaves the nitrogen warm exchanger via conduit 248, by now at a temperature of —214° F., and enters LNG vaporizer 246 where it is cooled to a temperature of —247° F. and thereby condensed by indirect heat exchange with vaporizing LNG as mentioned previously. The resulting liquid nitrogen leaves LNG vaporizer 246 via conduit 256, enters a nitrogen subcooler 258 where it is subcooled against the recycle lower pressure nitrogen vapor streams, leaves nitrogen subcooler 258 via conduit 260 at a temperature of about —251° F., and is then expanded through a valve 262 into a medium pressure flash drum 264. Medium pressure liquid nitrogen is taken from the bottom of the medium pressure flash drum and medium pressure liquid nitrogen leaving the bottom of flash drum 264, at a temperature of about —273° F. and a pressure of about 147 p.s.i.a., divides at point 266 into two streams, one stream being conducted through conduit 268 for utilization in the hydrogen liquefaction unit, where it is vaporized in a nitrogen vaporizer and then returned to the nitrogen refrigeration unit through conduit 270 still at a pressure of 147 p.s.i.a. and a temperature of —272° F. This medium pressure nitrogen vapor joins at point 272 the medium pressure nitrogen vapor rising from flash drum 264 and the combined flow then travels via conduit 274 through nitrogen subcooler 258 to assist in subcooling liquid nitrogen in conduit 256, then through nitrogen warm exchanger 254 to assist in cooling high pressure nitrogen vapor in conduit 252, and finally (by now at a temperature of about +32° F.) to nitrogen vapor compressor 280 to be recompressed to the high pressure of about 338 p.s.i.a.

The other medium pressure liquid nitrogen stream leaving point 266 travels through conduit 282 to a second nitrogen sub-cooler 284 where it is sub-cooled to −279° F. This sub-cooled liquid nitrogen then travels via conduit 286 to expansion valve 288 where it is expanded into a low pressure flash drum 290. Low pressure nitrogen vapor leaves the top of flash drum 290 at a pressure of about 51 p.s.i.a. and a temperature of about −297° F. and is conducted via conduit 292 through nitrogen subcoolers 284 and 258, nitrogen warm exchanger 254, and finally to nitrogen vapor compressor 294 where it is compressed back to medium pressure and joined at point 296 with medium pressure nitrogen vapor in conduit 274.

Low pressure liquid nitrogen leaves the bottom of low pressure flash drum 290 through conduit 298. As shown in FIG. 1, this low pressure liquid nitrogen stream in conduit 298 splits at point 300 into two streams, one stream passing through conduit 98 to the separation unit where, as mentioned, it is vaporized in nitrogen vaporizer 74, warmed in second vapor condenser 72 and is returned at a pressure of 48 p.s.i.a. and a temperature of −252° F. to the nitrogen refrigeration unit via conduit 104. As shown in FIG. 4, conduit 104 meets conduit 292 at point 302, the low pressure nitrogen vapor streams in conduits 104 and 292 joining before being conducted through nitrogen warm exchanger 254.

The remainder of the low pressure liquid nitrogen stream at point 300 (FIG. 1) is conducted through conduit 304 to the hydrogen liquefaction unit 6 where it is split into two streams, one of which is expanded to atmosphere and the other of which is expanded to vacuum in the production of liquid hydrogen. The details of the hydrogen liquefaction unit are not part of the present invention and will not be described, and it will be sufficient to note that the atmospheric nitrogen vapor stream and the vacuum nitrogen vapor stream are then returned from the hydrogen liquefaction unit via conduits 306 and 308 respectively to the nitrogen refrigeration unit 8. These return streams cycle in the usual manner through nitrogen subcooler 284, nitrogen subcooler 258, nitrogen warm exchanger 254, and are recompressed by compressors 310 and 312 prior to further refrigeration.

Reference is again made to FIG. 1, for description of the remaining details of the overall system. The various waste streams, i.e. the medium and high pressure methane waste streams and the propane waste stream, as well as the LNG vapor streams, are now pumped to pressure as required, combined and delivered to the pipeline for use by natural gas consumers. More specifically, the medium pressure methane waste leaving separation unit 4 via conduit 152 is compressed in compressor 314 to 404 p.s.i.a., is then combined at point 316 with the high pressure methane waste stream leaving separation unit 4 via conduit 142, and the combined waste stream is compressed in compressor 318 to pipeline pressure at 465 p.s.i.a.

The methane waste stream leaving compressor 318 (via conduit 320) joins at point 322 both the propane waste leaving separation unit 4 via conduit 245 (at a pressure of 465 p.s.i.a. as mentioned) and the high pressure natural gas vapor leaving separator unit 4 via conduit 194 (also at a pressure of 465 p.s.i.a. as mentioned). The low pressure natural gas vapor leaving separation unit 4 via conduit 116 (at a pressure of 15 p.s.i.a.) is compressed to 465 p.s.i.a. by compressor 324 and also joins the previously mentioned streams entering point 322.

The combined natural gas vapor and waste stream, at a temperature of between 14° and 20° F. and a pressure of 465 p.s.i.a., now exits from the system via conduit 326 to a pipeline (not shown) for consumer use.

FIG. 5 shows in highly simplified form some of the major steps of the process, and is self-explanatory, illustrating in a single flow line the major stages of separation of the feed stream of tail gas.

Any references in this description to the composition of a stream, or to the proportions in which a stream divides, or the like, are in terms of volume, and if a liquid is being referred to, the reference is in terms of its gaseous equivalent, all measured at a standard temperature and pressure.

It will be apparent that the embodiments shown are only exemplary and that various modifications can be made in construction and arrangement within the scope of the invention as defined in the appended claims.

We claim:

1. A process for separating hydrogen and hydrocarbons from a refinery tail gas of the type comprising hydrogen, methane, hydrocarbons heavier than methane, nitrogen, and oxides of carbon, said process comprising
   (a) introducing said refinery tail gas as a feed stream,
   (b) removing from said feed stream hydrocarbons heavier than methane to leave said feed stream as a gaseous effluent comprising methane, hydrogen, nitrogen, and oxides of carbon,
   (c) condensing the bulk of the methane from said gaseous effluent by indirect heat exchange with a stream of evaporating liquid nitrogen and a stream of regasified liquid natural gas, to leave said feed stream as primarily a hydrogen gas stream, contaminated with nitrogen and oxides of carbon,
   (d) scrubbing the hydrogen gas stream with liquid natural gas to remove said contaminating nitrogen and oxides of carbon, and
   (e) scrubbing the hydrogen gas stream resulting from said step (d) with subcooled hydrocarbon from the group consisting of $C_2$ and $C_3$ hydrocarbons to remove residual methane therefrom,
   (f) removing said scrubbing liquid natural gas after once through counter-current flow with said contaminated hydrogen gas stream for scrubbing thereof from further scrubbing use in said process.

2. A process according to claim 1 wherein said scrubbing hydrocarbon used in said step (e) is a product derived from said tail gas by said step (b), and after one through countercurrent flow with said hydrogen gas stream in said step (e), is removed from further scrubbing use in said process.

3. A process for separating hydrogen and hydrocarbons from a refinery tail gas of the type comprising hydrogen, methane, hydrocarbons heavier than methane, nitrogen, and oxides of carbon, said process comprising
   (a) introducing said refinery tail gas as a feed stream,
   (b) removing from said feed stream hydrocarbons heavier than methane to leave said feed stream as a gaseous effluent comprising methane, hydrogen, nitrogen, and oxides of carbon,
   (c) condensing the bulk of the methane from said gaseous effluent by indirect heat exchange with a stream of evaporating liquid nitrogen and a stream of regasified liquid natural gas, to leave said feed stream as primarily a hydrogen gas stream, contaminated with nitrogen and oxides of carbon,
   (d) scrubbing the hydrogen gas stream with liquid natural gas to remove said contaminating nitrogen and oxides of carbon,
   (e) scrubbing the hydrogen gas stream resulting from said step (d) with subcooled hydrocarbon from the group consisting of $C_2$ and $C_3$ hydrocarbons to remove residual methane therefrom,
   (f) liquefying said liquid nitrogen used in said step (c) by a process including cooling of nitrogen vapor by indirect heat exchange with liquid natural gas, thereby vaporizing said liquefied natural gas, and (g) using said vaporized natural gas in said step (c) for condensing methane from said gaseous effluent.

4. A process according to claim 1, wherein said step (b) includes the removal of at least a part of the hydrocarbons heavier than methane by indirect heat exchange between said feed stream, and both said natural gas vapor after its use in said step (c) and said methane condensed from said gaseous effluent in said step (c).

5. A process for separating hydrogen and hydrocarbons from a refinery tail gas of the type comprising hydrogen, methane, hydrocarbons heavier than methane, nitrogen, and oxides of carbon, said process comprising
  (a) introducing said refinery tail gas as a feed stream,
  (b) removing from said feed stream hydrocarbons heavier than methane to leave said feed stream as a gaseous effluent comprising methane, hydrogen, nitrogen, and oxides of carbon,
  (c) condensing the bulk of the methane from said gaseous effluent by indirect heat exchange with a stream of evaporating liquid nitrogen and a stream of regasified liquid natural gas, to leave said feed stream as primarily a hydrogen gas stream, contaminated with nitrogen and oxides of carbon,
  (d) scrubbing the hydrogen gas stream with liquid natural gas to remove said contaminating nitrogen and oxides of carbon,
  (e) scrubbing the hydrogen gas stream resulting from said step (d) with subcooled hydrocarbon from the group consisting of $C_2$ and $C_3$ hydrocarbons to remove residual methane therefrom, said step (b) including separation of $C_2$ hydrocarbons by fractional distillation using indirect heat exchange with a stream of evaporating liquid natural gas to form reflux.

6. A process for separating hydrogen and hydrocarbons from a refinery tail gas of the type comprising hydrogen, methane, hydrocarbons heavier than methane, nitrogen, and oxides of carbon, said process comprising
  (a) introducing said refinery tail gas as a feed stream,
  (b) removing from said feed stream hydrocarbons heavier than methane to leave said feed stream as a gaseous effluent comprising methane, hydrogen, nitrogen, and oxides of carbon,
  (c) condensing the bulk of the methane from said gaseous effluent by indirect heat exchange with a stream of evaporating liquid nitrogen and a stream of regasified liquid natural gas to leave said feed stream as primarily a hydrogen gas stream, contaminated with nitrogen and oxides of carbon,
  (d) scrubbing the hydrogen gas stream with liquid natural gas to remove said contaminating nitrogen and oxides of carbon,
  (e) scrubbing the hydrogen gas stream resulting from said step (d) with subcooled hydrocarbon from the group consisting of $C_2$ and $C_3$ hydrocarbons to remove residual methane therefrom, (f) said step (b) including successive condensations of portions of said feed stream to leave a liquid portion, at least one of said condensations employing indirect heat exchange between said feed stream and a stream of evaporating liquid natural gas, and said $C_2$ hydrocarbons are separated from said liquid portion and from each other by fractional distillation using indirect heat exchange with a stream of evaporating liquid natural gas to form reflux.

7. A process for separating hydrogen and hydrocarbons from a refinery tail gas of the type comprising hydrogen, methane, hydrocarbons heavier than methane, nitrogen, and oxides of carbon, said process comprising
  (a) introducing said refinery tail gas as a feed stream,
  (b) removing from said feed stream hydrocarbons heavier than methane to leave said feed stream as a gaseous effluent comprising methane, hydrogen, nitrogen, and oxides of carbon,
  (c) condensing the bulk of the methane from said gaseous effluent by indirect heat exchange with a stream of evaporating liquid nitrogen and a stream of regasified liquid natural gas, to leave said feed stream as primarily a hydrogen gas stream, contaminated with nitrogen and oxides of carbon,
  (d) scrubbing the hydrogen gas stream with liquid natural gas to remove said contaminating nitrogen and oxides of carbon,
  (e) scrubbing the hydrogen gas stream resulting from said step (d) with subcooled hydrocarbon from the group consisting of $C_2$ and $C_3$ hydrocarbons to remove residual methane therefrom,
  (f) wherein liquid natural gas is introduced from a supply thereof,
  (g) a first stream of said liquid natural gas is brought into indirect heat exchange relation with nitrogen vapor for production of said liquid nitrogen used in said step (c) thereby vaporizing said liquid natural gas,
  (h) said natural gas vapor resulting from said step (g) is then used in said step (c) for condensing methane from said gaseous effluent,
  (i) a second stream of said liquid natural gas is used in said step (d) for scrubbing said hydrogen gas stream,
  (j) said step (b) includes successive condensations of portions of said feed stream, said condensations including indirect heat exchange between said feed stream and
    (i) a third stream of said liquid natural gas,
    (ii) said methane condensed in said step (c), thereby vaporizing said methane,
    (iii) said second stream of liquid natural gas after its use in said step (d), thereby vaporizing said second stream of liquid natural gas,
  and said step (b) further includes separation of $C_2$ hydrocarbons from said liquid portion and from each other by fractional distillation using indirect heat exchange with a fourth stream of liquid natural gas as reflux, thereby vaporizing said fourth stream,
  (k) said scrubbing hydrocarbon used in said step (d) is a product derived from said feed stream by said step (b), said scrubbing hydrocarbon after one flow-through flow past said hydrogen gas stream being removed from further scrubbing use in said process and vaporized,
  (l) and all said liquid natural gas streams, and said scrubbing hydrocarbon stream, after vaporization thereof, are combined for consumer use as natural gas.

References Cited

UNITED STATES PATENTS

| | | | |
|---|---|---|---|
| 2,880,592 | 4/1959 | Davison. | |
| 2,886,611 | 5/1959 | King et al. | 62—17 XR |
| 2,936,593 | 5/1960 | Grunberg. | |
| 3,062,015 | 11/1962 | Cost | 62—23 XR |
| 3,073,129 | 1/1963 | Grenier | 62—28 |
| 3,119,677 | 6/1964 | Moon et al. | 62—23 |
| 3,315,475 | 4/1967 | Harmens | 62—17 XR |

OTHER REFERENCES

Cryogenic Washing Scrubs Hydrogen for Liquid-Fueled Rockets, by Eugene Guccione, May 1963, Chemical Engineering, pp. 150–152.

NURMAN YUDKOFF, *Primary Examiner.*

V. W. PRETKA, *Assistant Examiner.*